March 15, 1966  W. RALL  3,241,057
APPARATUS FOR DETERMINING GRAIN ORIENTATION
IN A FERROMAGNETIC SHEET
Filed June 7, 1962
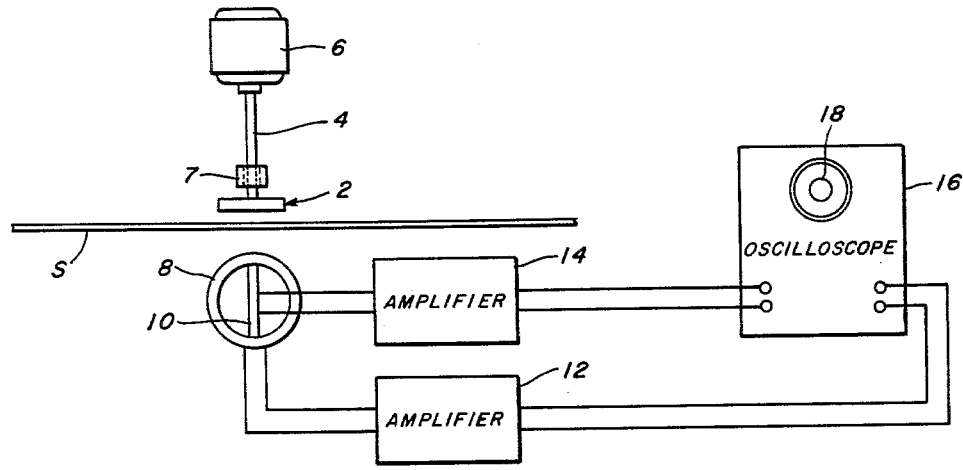
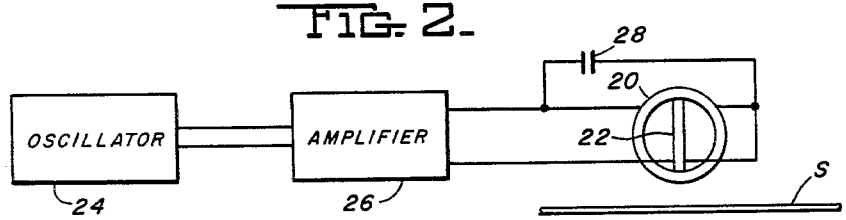
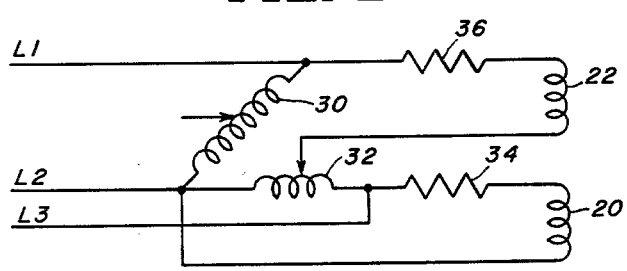
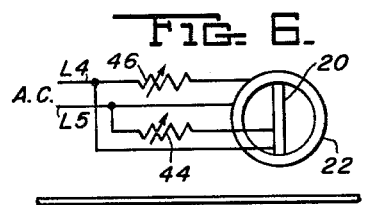
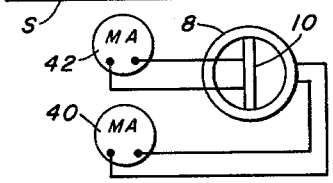
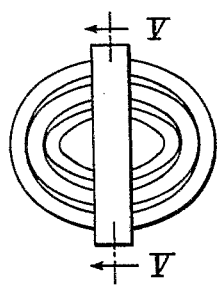
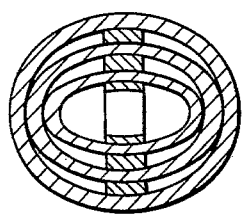
INVENTOR.
WALDO RALL
By Donald H. Dalton
Attorney 3,241,057
APPARATUS FOR DETERMINING GRAIN ORIENTATION IN A FERROMAGNETIC SHEET
Waldo Rall, Pittsburgh, Pa., assignor to United States Steel Corporation, a corporation of New Jersey
Filed June 7, 1962, Ser. No. 200,877
9 Claims. (Cl. 324—34)

This invention relates to apparatus for determining grain orientation in a ferromagnetic sheet and particularly in electrical steel sheets. Grain orientation is important in determining the quality of such sheets. Gross correlations between core loss and orientation exist so that a knowledge of the orientation can frequently be used to sort electric steels as to quality. Other materials are also sold on the basis of the orientation specifications. Orientation also affects the formability (particularly the deep-drawing characteristics) of the materials, and knowledge of orientation is important from this standpoint. Present methods of determining orientation depend upon X-ray diffraction analyses and torque magnetometer measurements. Both of these methods require large, cumbersome equipment and are not readily suitable for continuous determinations nor for portable field equipment. The torque magnetometer has the additional disadvantage that it requires special disc samples which must be punched from the sheet being tested.

It is therefore an object of my invention to provide a simple apparatus for determining grain orientation in a ferromagnetic sheet which does not require destruction of the material tested and which may be used in continuous testing.

This and other objects will be more apparatus after referring to the following specification and attached drawings, in which:

FIGURE 1 is a schematic view of one embodiment of my invention;

FIGURE 2 is a schematic view of a second embodiment of my invention;

FIGURE 3 is a schematic view of another embodiment of my invention;

FIGURE 4 is a view of a detail;

FIGURE 5 is a view taken on the line V—V of FIGURE 4; and

FIGURE 6 is a schematic view of still another embodiment of my invention.

Referring more particularly to FIGURE 1 of the drawings, reference numeral 2 indicates a bar magnet which is supported closely adjacent the top side of a ferromagnetic sheet S to be tested. Magnet 2 is arranged in a plane parallel to the sheet S in close proximity thereto and is carried by a shaft 4 which is rotated at a fixed frequency by means of a synchronous motor 6. The end of shaft 4 is preferably supported by a bearing 7 adjacent magnet 2. The bar magnet 2 may be 2″ by ⅜″ by ⅜″ and have a 230 gauss pole strength. The motor 6 may have a horsepower of ½₀ and rotate at 1800 r.p.m. Two coils 8 and 10 are disposed on the opposite side of the sheet S in close proximity thereto. The coils 8 and 10 may have 2,000 turns of 40 gauge wire and have an average diameter of 3 inches. The planes of the coils 8 and 10 are arranged at 90° with respect to one another and are normal to the sheet S. The intersection of the coils 8 and 10 is aligned with a axis of the magnet 2 and shaft 4. The outputs of the coils 8 and 10 are connected to conventional high fidelity audio amplifiers 12 and 14, respectively. The amplifiers may be Bogen Model HE10. The outputs of amplifiers 12 and 14 are connected to the vertical and horizontal oscilloscope beam deflector plates of a conventional oscilloscope 16 so as to produce a distinctive recurrent trace.

In operation, the motor 6 rotates the magnet 2 so as to provide a magnetic field whose direction in the plane of the sheet S is varied through 360°. The amplified signals from detector coils 8 and 10 appear on the oscilloscope 16 as a trace 18. As shown in FIGURE 1 this trace 18 is a circle and is representative of non-oriented material. When the steel sheet is singly oriented, as are commercial grain-oriented silicon-steel sheets, the trace takes the form of an ellipse. When the material is doubly oriented the trace appears as a four-leaf-clover pattern. The basis of my invention is the determination of the degree of magnetic shielding afforded by the steel sheet to a magnetic field whose direction in the plane of the sheet is varied. For each trace the distance from the center of the pattern to the outside thereof at any given angle is inversely proportional to the shielding ability or permeability of the corresponding direction of the sheet being tested.

In the embodiment of my invention shown in FIGURE 2, the magnet 2 and associated mechanism is replaced by a pair of crossed coils 20 and 22 which may be made of 1600 turns of 128 gauge wire and have an average diameter of 2½″. The coils 20 and 22 are arranged on the opposite side of the sheet S from the coils 8 and 10 and are in close proximity to the sheet S. The coils 20 and 22 are arranged at 90° with respect to one another in planes normal to the sheet S with their intersection being aligned with the intersection of coils 8 and 10. Sinusoidal currents 90° out of phase with each other are provided for the coils 20 and 22 by means of a conventional audio oscillator 24 (such as a General Radio Model 1301A), preferably at a frequency of about 60 cycles per second if the sheet is to be tested as a component for 60 cycle equipment. The output of the oscillator 24 is connected to a high-fidelity audio amplifier 26 (such as a Bogen Model HE10). The sinusoidal current from the amplifier 26 is connected to a phase shifter so as to provide two identical output signals which are 90° out of phase. As shown this is done by connecting the output of amplifier 26 to the parallel combination of coil 20 and a capacitor 28. The parallel combination of coil 20 and capacitor 28 is connected in series with coil 22. The capacitor 28 is chosen so as to be resonant with the coil 20 at the desired operational frequency. The sinusoidal currents flowing through the coils 20 and 22 generate a rotating magnetic field at the frequency of the audio oscillator 24. This embodiment operates in the same way as the embodiment of FIGURE 1, the connections from coils 8 and 10 being omitted from FIGURE 2.

FIGURE 3 shows another way of supplying a sinusoidal current to the coils 20 and 22. In accordance with this embodiment, the three-phase power line L1, L2 and L3 having a frequency of 60 cycles per second is connected through two conventional variable auto-transformers 30 and 32 (such as Powerstat Model 216) to coils 20 and 22. Suitable resistors 34 and 36 are connected in series with coils 20 and 22, respectively, to reduce and equalize the voltage in the variable transformers to that for which the coils are best suited.

While the coils 8, 10, 11 and 22 are shown as circular, I have found that greater sensitivity can be obtained if they are elliptical in shape, as shown in FIGURES 4 and 5, with the major axis of the ellipse parallel to the plane of the sheet S.

If it is desired to determine only longitudinal and transverse degrees of orientation the coils 8 and 10 may be directly connected to two conventional A.C. milliammeters or to sensitive recording A.C. milliammeters 40 and 42 and the coils 20 and 22 may be connected in parallel to a 60-cycle 120-volt power line L4, L5 through suitable current-controlling resistors 44 and 46 as shown in FIGURE 6. Thus a changing magnetic field is provided having components in two directions 90° apart.

While several embodiments of my invention have been shown and described, it will be apparent that other adaptations and modifications may be made without departing from the scope of the following claims.

I claim:

1. Apparatus for determining grain orientation in a ferromagnetic sheet which comprises means on one side of the sheet for producing a magnetic field having main components in at least two intersecting directions in a plane parallel to the sheet, means at the opposite side of the sheet for separately detecting the magnitude only of each of the said components in the magnetic field passing through said sheet, and means for comparing the detected magnitudes to determine the degree of grain orientation.

2. Apparatus for determining grain orientation in a ferromagnetic sheet which comprises means on one side of the sheet for producing a magnetic field whose direction in the plane of the sheet is varied through 360° about an axis normal to said sheet, a pair of intersecting coils mounted at the opposite side of the sheet arranged at right angles to one another, said coils intersecting on a line in alignment with said axis, and comparing means connected to said coils.

3. Apparatus for determining grain orientation in a ferromagnetic sheet which comprises a bar magnet mounted at one side of the sheet in a plane parallel to the sheet, means for rotating said magnet about an axis normal to the sheet, a pair of intersecting coils mounted at the opposite side of the sheet arranged at right angles to one another, said coils intersecting on a line in alignment with said axis, and comparing means connected to each of said coils.

4. Apparatus for determining grain orientation in a ferromagnetic sheet which comprises a bar magnet mounted at one side of the sheet in a plane parallel to the sheet, means for rotating said magnet about an axis normal to the sheet, a pair of intersecting coils mounted at the opposite side of the sheet arranged at right angles to one another, said coils intersecting on a line in alignment with said axis, each of said coils being elliptical in shape with its major axis parallel to the plane of the sheet, an amplifier connected to each of said coils, and an oscilloscope connected to the output of said amplifiers.

5. Apparatus for determining grain orientation in a ferromagnetic sheet which comprises a first pair of intersecting coils mounted at one side of the sheet and arranged at right angles to one another, said coils intersecting on a line normal to the sheet, means for providing a sinusoidal current to said coils, the current to one coil being 90° out of phase with the current to the other coil, a second pair of intersecting coils mounted at the opposite side of the sheet and arranged at right angles to one another, said second pair of coils intersecting on a line in alignment with the line of intersection of said first pair of coils, and comparing means connected to each of said second pair of coils.

6. Apparatus for determining grain orientation in a ferromagnetic sheet which comprises a first pair of intersecting coils arranged at right angles to one another, said coils intersecting on a line normal to the sheet, means for providing a sinusoidal current to said coils, the current to one coil being 90° out of phase with the current to the other coil, a second pair of intersecting coils mounted at the opposite side of the sheet arranged at right angles to one another, said second pair of coils intersecting on a line in alignment with the line of intersection of said first pair of coils, each of said coils being elliptical in shape with its major axis parallel to the plane of the sheet, an amplifier connected to each of said second pair of coils, and an oscilloscope connected to the output of said amplifiers.

7. Apparatus according to claim 2 in which each of said coils is elliptical in shape with its major axis parallel to the plane of the sheet.

8. Apparatus according to claim 3 in which each of said coils is elliptical in shape with its major axis parallel to the plane of the sheet.

9. Apparatus according to claim 5 in which each of said coils is elliptical in shape with its major axis parallel to the plane of the sheet.

References Cited by the Examiner

UNITED STATES PATENTS

| | | | |
|---|---|---|---|
| 2,057,835 | 10/1936 | Karajan | 324—34 |
| 2,900,598 | 8/1959 | Singelman | 324—34 |
| 2,924,772 | 2/1960 | Reighter | 324—34 |

WALTER L. CARLSON, *Primary Examiner.*